United States Patent [19]

Shiflet

[11] 4,126,725
[45] Nov. 21, 1978

[54] HIGH PRESSURE LAMINATES

[75] Inventor: Frank L. Shiflet, Waynesboro, Va.

[73] Assignee: Hopeman Brothers, Inc., New York, N.Y.

[21] Appl. No.: 787,838

[22] Filed: Apr. 15, 1977

Related U.S. Application Data

[63] Continuation-in-part of Ser. No. 627,750, Oct. 31, 1975, Pat. No. 4,033,084.

[51] Int. Cl.² ............................................. B32B 5/12
[52] U.S. Cl. ................................... 428/110; 428/131; 428/138; 428/256; 428/285; 428/457; 428/920
[58] Field of Search ................ 156/288, 219; 428/107, 428/110, 132, 133, 134, 138, 140, 156, 247, 256, 285, 531, 920, 131

[56] References Cited

U.S. PATENT DOCUMENTS

| 3,373,068 | 3/1968 | Grosheim et al. | 156/219 |
| 3,674,619 | 7/1972 | Scher et al. | 156/219 |
| 3,700,537 | 10/1972 | Scher | 428/138 |
| 3,701,706 | 10/1972 | Giddings et al. | 156/288 |
| 3,723,220 | 3/1973 | Scher et al. | 156/219 |
| 3,761,338 | 9/1973 | Ungar et al. | 156/219 |
| 3,928,706 | 12/1975 | Gibbons | 156/288 |
| 3,997,696 | 12/1976 | Jaisle et al. | 156/219 |
| 4,030,955 | 6/1977 | Antonio et al. | 156/288 |

Primary Examiner—James J. Bell
Attorney, Agent, or Firm—George A. Smith, Jr.

[57] ABSTRACT

Dimensional stability of melamine decorative laminates is improved by a pair of spaced, foraminous steel foil layers, which resist shrinkage of the melamine layer. Steel foil layers are also used to prevent splitting of low-strength wallboard cores as a result of shrinkage of melamine facings, and each facing need have only a single steel foil layer in the case of a wallboard.

21 Claims, 11 Drawing Figures

HIGH PRESSURE LAMINATES

CROSS REFERENCE TO RELATED APPLICATION

This application is in part a continuation of my copending application, Ser. No. 627,750, filed Oct. 31, 1975, now U.S. Pat. No. 4,033,084, dated July 5, 1977.

SUMMARY OF THE INVENTION

This invention relates to high-pressure laminates, and to the improvement of their impact strength, fire resistance, and dimensional stability under conditions of low humidity. The invention relates also to the prevention of splitting of low-strength wallboard cores due to the shrinkage of decorative facings.

A typical high-pressure decorative laminate comprises a number of plies of phenolic-impregnated kraft paper together with a decorative layer, which may be either a sheet of melamine-impregnated, pigmented alpha-cellulose paper, or a combination of a melamine-impregnated alpha-cellulose tissue over a melamine-impregnated printed or solid color, alpha-cellulose ply. The various layers are subjected to heat and pressure in a press to produce the laminate.

Melamine laminates are frequently used as the headliners and wainscots of busses. Unfortunately, in numerous bus accidents cited by the National Transportation Safety Board, laminated interior panels have been fractured on impact because of their brittleness. The fracturing of the panels exposes sharp, jagged edges, which pose a serious hazard to passengers. In accordance with the invention, a melamine laminate having a greater impact resistance is provided by utilizing a pair of spaced metal foil layers in addition to the phenolic layers. The metal foil layers are located on the same side of the melamine layer, but are separated from each other by at least one phenolic layer. Under conditions of physical abuse, the laminate exhibits a much greater resistance to impact than conventional laminates.

The metal layers also conduct heat, and therefore improve the fire resistance of the laminate.

Another important consideration in the use of melamine laminates is dimensional stability. The decorative melamine layers have a tendency to shrink when exposed to low humidity for substantial periods of time. The shrinkage of the melamine layer frequently causes the laminate to become deformed. The use of two, spaced sheet metal layers in the laminate greatly improves its dimensional stability, and reduces the tendency of the laminate to become deformed.

Attempts have been made to use decorative melamine laminates as facings for gypsum wallboards. Here, the tendency of the melamine layers to shrink in low humidity is particularly serious as it causes the gypsum core to split. Decorative laminates made with one or more metal foil layers, however, are sufficiently resistant to bending that they can be used satisfactorily as facings on gypsum and other low-strength wallboard cores and withstand extremely low humidity for extended periods of time.

The general object of the invention is to provide a high pressure laminate which has a high impact strength, fire resistance, and dimensional stability under conditions of low humidity. It is also an object of the invention to provide a faced wallboard having a low-strength core, which is stable under conditions of low humidity, and which is at the same time relatively inexpensive.

Other objects will be apparent from the following detailed description when read in conjunction with the drawings.

DETAILED DESCRIPTION

Figure 1:
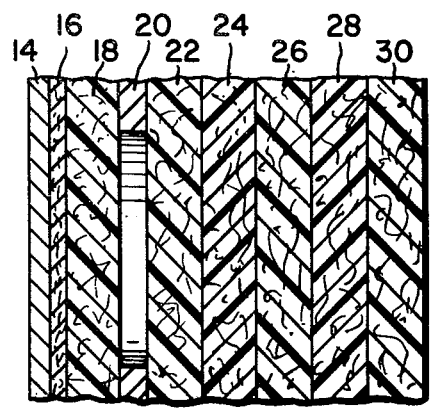
FIG. 1 is a transverse cross-sectional view of a laminate designed for use as a facing for a wallboard made in accordance with the invention.
Figure 2:
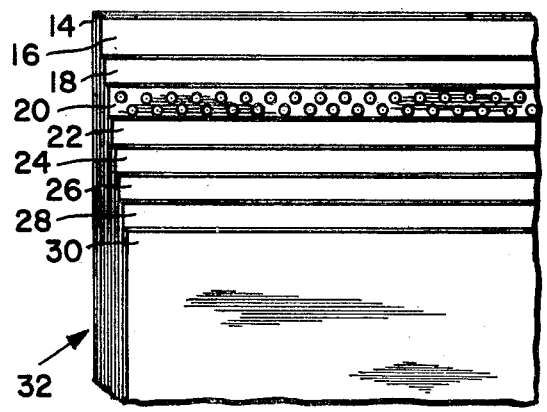
FIG. 2 is a perspective view showing the various layers of the laminate of FIG. 1.

In FIGS. 1 and 2 a wallboard facing is shown comprising a two-ply decorative layer consisting of a sheet 14 of melamine-impregnated alpha cellulose tissue over a melamine-impregnated alpha cellulose ply 16, the latter being printed to provide the desired decorative pattern or color. Located next to ply 16 is a sheet 18 of phenolic-impregnated kraft paper.

On the opposite side of sheet 18, a metal foil layer 20 is provided. The metal foil layer is preferably steel, and is also preferably foraminous, both for lightness in weight, and also for the purpose of allowing bridges of resin to secure the phenolic layers on the opposite sides of the foil layer together. Desirably, a pattern of holes is punched in sheet 20, as seen in FIG. 2.

Additional phenolic-impregnated kraft paper layers are provided at 22, 24, 26, 28 and 30. When these layers are subjected to pressure and heat in a press, a laminate 32 is formed which can be used as a wallboard facing, as will be described.

Figure 3:
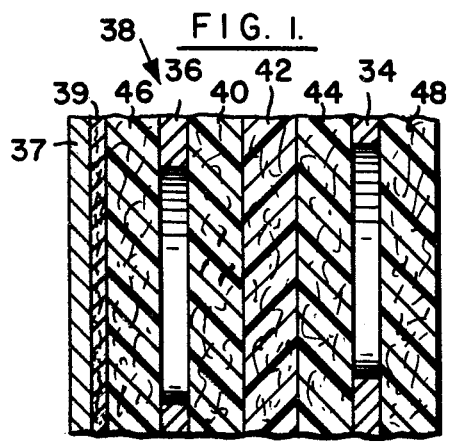
FIG. 3 is a transverse cross-section of a laminate in accordance with the invention having two spaced metal foil sheets.
Figure 4:
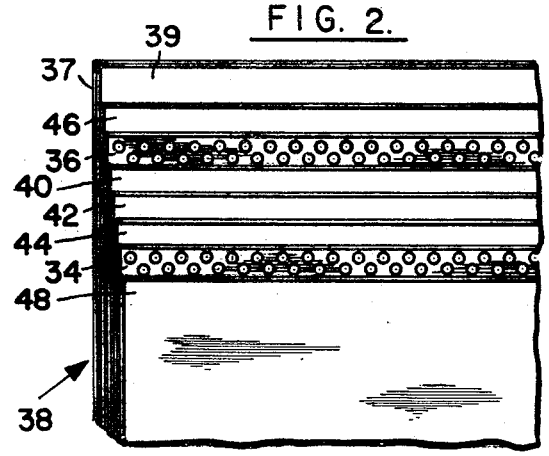
FIG. 4 is a perspective view showing the various layers of the laminate of FIG. 3.

FIGS. 3 and 4 show a laminate 38 which can be used either as a wallboard facing, or by itself in applications such as headliners or wainscots of busses and other vehicles used for public transportation. The laminate of FIGS. 3 and 4 is similar to that shown in FIGS. 1 and 2 in all respects except that phenolic sheet 28 is replaced by a second metal foil layer 34. In this laminate, therefore, there are two metal foil sheets 34 and 36. These metal foil layers are preferably foraminous sheets of steel. As shown, they are both located on the same side of the two-ply decorative melamine layer comprising sheets 37 and 39, but are spaced from each other by three phenolic layers 40, 42 and 44. An additional phenolic layer 46 is located between melamine sheet 39 and metal foil layer 36, and another phenolic layer 48 is located on the side of the laminate which is opposite the melamine layer. Preferably, the two metal foil layers 34 and 36 are separated from each other by as great a distance as possible, using additional phenolic layers as required. However, phenolic layer 48 is desirably provided to cover metal layer 34, and phenolic layer 46 is likewise provided in order to prevent the pattern of perforations in metal foil layer 36 from affecting the texture of the outer melamine layer 37.

Figure 9:
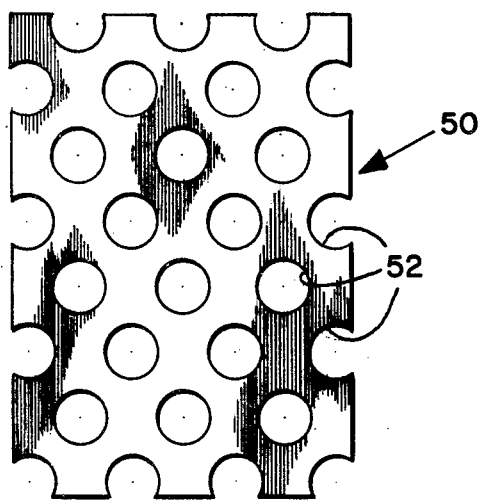
FIG. 9 is an elevation of a foraminous steel sheet of the type used in the laminate of FIGS. 1 and 3.

FIG. 9 shows a type of foraminous steel foil sheet suitable for use in layer 20 of FIG. 1 and in layers 34 and 36 of FIG. 3. The steel foil sheet designated 50 is provided with round openings 52 arranged in a uniform pattern. The round shape was chosen because it represents the most common shape available in metal punches. However, the shape of the openings is of little consequence provided that the foil is flat (without burrs or bumps), and possesses in the perforated form, sufficient compressive strength in the plane of the foil to resist the shrinkage stresses imposed on the laminate by the melamine layer. Preferably, in order to provide sufficient compressive strength, the metal foil layers are each at least approximately 0.002 inch in thickness.

While foraminous metal foil sheets provide better adhesion between the phenolic layers because bridges of resin extend through the openings and secure the phenolic sheets together, unperforated steel foil can be used provided that suitable precautions are taken to insure adhesion of the phenolic layers to the foil. The steel foil can be prepared, for example, by treatment with a 10% solution of Butvar B-90 (Monsanto Company) in denatured alcohol. Butvar B-90 is a well-known polyvinyl butyral adhesive, and is used in this instance as a metal primer to secure the unperforated steel foil to the adjacent phenolic layers. The steel foil is air dried in an inclined position for about ten minutes, and then is oven dried for five minutes at 250° F. and allowed to cool. Other suitable metal adhesives can be used instead of Butvar B-90. In addition, in some instances it is desirable to use Butvar B-90 or another suitable adhesive even when foraminous metal foil sheets are used.

Figure 5:
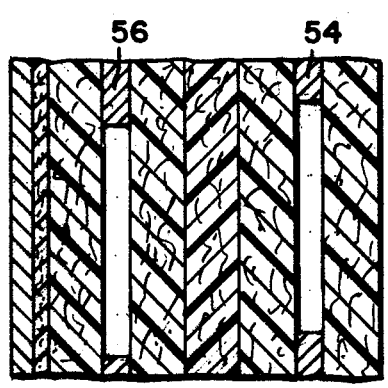
FIG. 5 is a transverse cross-section of an alternate laminate in accordance with the invention wherein the spaced sheet metal layers are in the form of wire screens.
Figure 6:
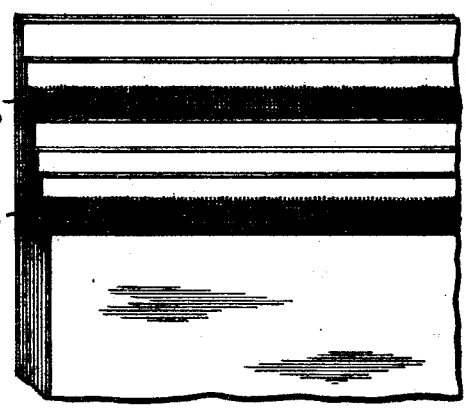
FIG. 6 is a perspective view showing the various layers of the laminate of FIG. 5.
Figure 10:
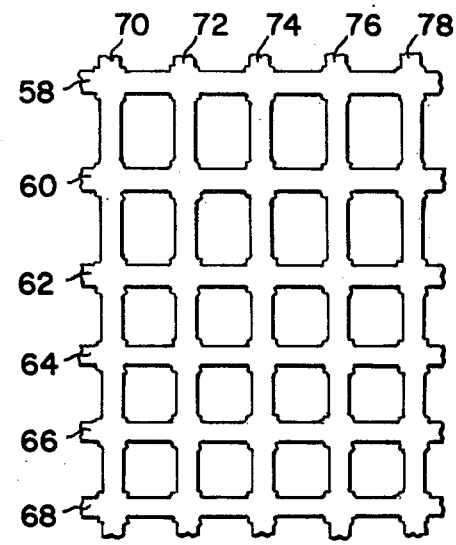
FIG. 10 is an elevational view of a wire screen of the kind used in the laminate of FIG. 5.
Figure 11:
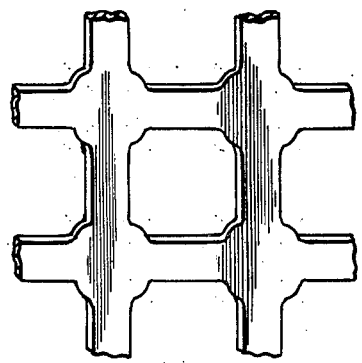
FIG. 11 is a perspective view showing the details of the wire screen of FIG. 10.

FIGS. 5 and 6 show another laminate which is suitable for use either as a wallboard facing, or by itself as a headliner or wainscot for a transportation vehicle. The laminate of FIGS. 5 and 6 is similar to that of FIGS. 3 and 4 in all respects except that foraminous layers 34 and 36 are replaced respectively by foraminous layers 54 and 56, which are flattened steel wire screens. The construction of these screens is illustrated in FIGS. 10 and 11. In FIG. 10, the screen is shown as comprising a first array of generally parallel steel wires 58, 60, 62, 64, 66 and 68, and a second array of generally parallel steel wires 70, 72, 74, 76 and 78. The wires of the second array are superimposed upon those of the first array and arranged in substantially perpendicular relationship to the wires of the first array to form a foraminous layer.

The wires of the screen are flattened, as illustrated in FIG. 11, the flattening being accomplished by compression of the screen between a pair of rollers. Flattening by compression causes the perpendicular wires of the screen to merge together where they cross, forming what is essentially a metal foil layer similar to the one shown in FIG. 9. If desired, heat may be applied in order to forge the wires together. Flattening of the wires reduces the tendency of the pattern of the screen to appear on the melamine surface of the laminate. In addition, the flattening process makes it possible to form a screen without the need for weaving. Instead, the second array of parallel wires is placed on top of the first array of parallel wires, and the arrays are then compressed to produce a screen. The perpendicular wires of the screen are held together with sufficient strength by the compression to enable the screen to be handled in the process of forming the laminate. After the laminate is formed, the perpendicular wires of the screen are held together by virtue of the elements of phenolic resin which extend through the openings of the screen between opposed layers of phenolic-impregnated kraft paper.

Figure 7:
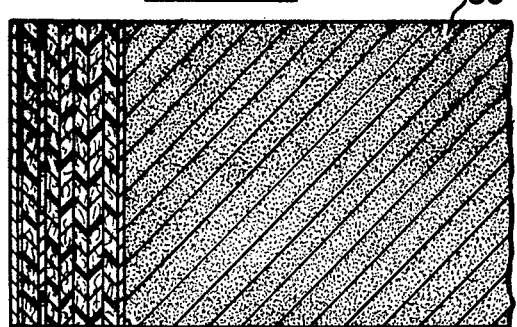
FIG. 7 is a transverse cross-sectional view of a first wallboard in accordance with the invention.
Figure 7:
Figure 12:
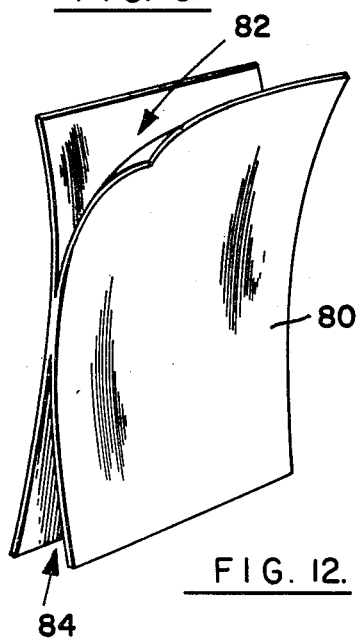
FIG. 12 is a perspective view showing the manner in which faced wallboards of the prior art tend to split when subjected to conditions of low humidity.

The melamine layers of ordinary melamine-faced wallboards tend to shrink under conditions of low humidity, producing the condition illustrated in FIG. 12. FIG. 12 shows a gypsum wallboard 80 partially split at locations 82 and 84 as a result of shrinkage of a synthetic resin containing facing. It is this type of splitting which the invention is intended to avoid. FIG. 7 illustrates a gypsum wallboard faced on both sides with laminates of the type illustrated in FIG. 1. This wallboard comprises a gypsum core 86 having paper layers 88 and 90 on its opposite sides, and being provided with identical melamine-faced laminates 92 and 94 on its opposite sides. The melamine laminates are secured to their respective paper layers by a suitable adhesive. Each melamine laminate has a single foraminous metal foil layer, as shown in FIG. 1, and the single metal foil layer is sufficient to prevent splitting of the gypsum core even when the wallboard is exposed to very low humidity for extended periods of time. It is possible, of course, to use facing laminates having two metal foil layers, of the kind shown in FIGS. 3 and 5, but normally it is unnecessary to do so. It is desirable, however, to provide facings on both sides of the gypsum wallboard, as the facings on opposite side of the wallboard tend to balance each other and prevent bowing of the wallboard.

Often, it is not practical to provide facings on both sides, as one side of the wallboard is hidden. When this is the case, a wallboard of the kind shown in FIG. 8 may be used. The wallboard comprises a gypsum core 96 having paper faces 98 and 100 on its opposite sides. A laminate 102, of the kind shown in FIG. 1, is secured to paper layer 98 by a suitable adhesive. On the opposite side of the core, a metal sheet 104 is secured by adhesive to paper layer 100 to provide the necessary balance in order to prevent bowing of the wallboard.

Figure 8:
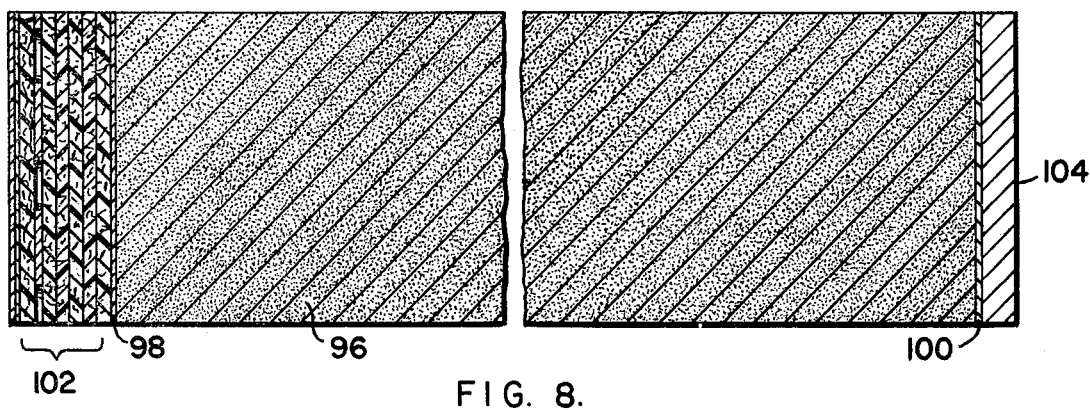
FIG. 8 is a transverse cross-sectional view of a second wallboard in accordance with the invention.

A wallboard made up in accordance with the structure of FIG. 7 or 8 is an entirely new product in that it has not been practical, heretofore, to use a melamine facing on a low-strength wallboard core without subjecting the core to the kind of splitting illustrated in FIG. 12. Various low-strength core materials other than gypsum may be used, for example calcium silicate, mineral wool, ceramic fiber, perlite, sodium silica or silicate, or cement asbestos. The invention enables any of these materials to be faced with a decorative melamine laminate on one or both sides without being subject to splitting in a low humidity environment. The improved physical strength imparted to the wallboard by reason of the presence of the metal foil layers also makes it possible to use wider and taller panels and to use fewer supports.

The wallboard in accordance with the invention has certain advantages from the standpoint of fire protection. In the first place, the combustion products of melamine-formaldehyde and phenolic resins are comparatively less toxic than those of some so-called "fire-resistant" laminates. Secondly, the presence of the metal foil layer or layers reinforce the laminate, making it possible to use a minimum amount of flammable material. Third, the metal foil layer or layers in the facing act as heat sinks, improving the fire resistance of the wallboards.

The use of two spaced metal foil layers in the laminate, as shown in FIGS. 3 and 5 produces a laminate which is greatly improved from the standpoint of dimensional stability. The laminate also exhibits improved impact strength by reason of the ductility of the metal foil layers. The dimensional stability and high impact strength of the laminate makes it especially suitable for use in vehicle interiors.

The laminates in accordance with the invention may, of course, be used either by themselves, or as facings for low-strength wallboards, or even as facings for high-strength wallboard cores, including aluminum honeycombs and the like.

I claim:

1. In a high pressure decorative laminate comprising a plurality of layers and adhesive means rigidly securing said layers together to provide a self-sustaining laminate, said layers including a plurality of phenolic layers, and a synthetic resin-containing layer having a tendency to shrink under conditions of low humidity thereby tending to cause deformation of the laminate, the improvement comprising the fact that said plurality of layers includes two steel foil layers, each layer being at least approximately 0.002 inch in thickness, both steel foil layers being located on the same side of said synthetic resin-containing layer but being separated from each other by at least one of said phenolic layers.

2. A high pressure laminate according to claim 1 in which each of said steel foil layers is a foraminous sheet of steel.

3. A high pressure laminate according to claim 1 in which each of said steel foil layers is a wire screen.

4. A high pressure laminate according to claim 1 in which each of said steel foil layers is a wire screen comprising a first array of generally parallel steel wires, and a second array of generally parallel steel wires arranged in substantially perpendicular relationship to the wires of the first array, the screen being flattened so that the wires in both arrays are substantially coextensive in the direction perpendicular to the layers of the laminate.

5. A high pressure laminate according to claim 1 in which the synthetic resin-containing layer having a tendency to shrink under conditions of low humidity is a decorative melamine layer.

6. In a wallboard comprising a low-strength wallboard core having facings on both of its sides, at least one of said facings comprising a synthetic resin-containing layer having an exposed surface and having a tendency to shrink under conditions of low humidity thereby tending to cause said core to split, the improvement comprising a first sheet of steel secured between the core and the exposed surface of the synthetic resin-containing layer, and a second sheet of steel secured on the opposite side of said core each of said steel sheets being at least approximately 0.002 inch in thickness.

7. A wallboard according to claim 6 in which the synthetic resin-containing layer having a tendency to shrink under conditions of low humidity is a decorative melamine layer.

8. A wallboard according to claim 6 in which the core is a gypsum core.

9. A wallboard according to claim 6 in which the other facing comprises a second synthetic resin-containing layer having an exposed surface and having a tendency to shrink under conditions of low humidity, and in which said second sheet of steel is located between the core and the exposed surface of the second synthetic resin-containing layer.

10. A high pressure laminate according to claim 1 in which the synthetic resin-containing layer having a tendency to shrink under conditions of low humidity is a thermosetting impregnated layer.

11. A high pressure laminate according to claim 1 in which the synthetic resin-containing layer having a tendency to shrink under conditions of low humidity is a thermosetting impregnated layer and in which said phenolic layers are layers of phenolic-impregnated kraft paper.

12. A high pressure laminate according to claim 1 in which the synthetic resin-containing layer having a tendency to shrink under conditions of low humidity is a melamine-impregnated layer.

13. A high pressure laminate according to claim 1 in which the synthetic resin-containing layer having a tendency to shrink under conditions of low humidity is a melamine-impregnated layer and in which said phenolic layers are layers of phenolic-impregnated kraft paper.

14. A high pressure laminate according to claim 1 in which the synthetic resin-containing layer having a tendency to shrink under conditions of low humidity is a two-ply layer consisting of melamine-impregnated alpha cellulose tissue over a melamine-impregnated alpha cellulose ply.

15. A high pressure laminate according to claim 1 in which the synthetic resin-containing layer having a tendency to shrink under conditions of low humidity is a two-ply layer consisting of melamine-impregnated alpha cellulose tissue over a melamine-impregnated alpha cellulose ply, and in which said phenolic layers are layers of phenolic-impregnated kraft paper.

16. A wallboard according to claim 6 in which the synthetic resin-containing layer having a tendency to shrink under conditions of low humidity is a thermosetting impregnated layer.

17. A wallboard according to claim 6 in which the synthetic resin-containing layer having a tendency to shrink under conditions of low humidity is a melamine-impregnated layer.

18. A wallboard according to claim 6 in which the synthetic resin-containing layer having a tendency to shrink under conditions of low humidity is a two-ply layer consisting of melamine-impregnated alpha cellulose tissue over a melamine-impregnated alpha cellulose ply.

19. A wallboard according to claim 9 in which the second synthetic resin-containing layer having a tendency to shrink under conditions of low humidity is a thermosetting impregnated layer.

20. A wallboard according to claim 9 in which the second synthetic resin-containing layer having a tendency to shrink under conditions of low humidity is a melamine-impregnated layer.

21. A wallboard according to claim 9 in which the second synthetic resin-containing layer having a tendency to shrink under conditions of low humidity is a two-ply layer consisting of melamine-impregnated alpha cellulose tissue over a melamine-impregnated alpha cellulose ply.

* * * * *